(12) United States Patent
Lin

(10) Patent No.: US 7,012,212 B2
(45) Date of Patent: Mar. 14, 2006

(54) EDM DRILL

(75) Inventor: Tong-Han Lin, Tainan Hsien (TW)

(73) Assignee: Tai-I Electron Machining Co., Ltd., Tainan Hsien (TW)

( * ) Notice: Subject to any disclaimer, the term of this patent is extended or adjusted under 35 U.S.C. 154(b) by 95 days.

(21) Appl. No.: 10/854,370

(22) Filed: May 27, 2004

(65) Prior Publication Data

US 2004/0256363 A1 Dec. 23, 2004

Related U.S. Application Data

(60) Division of application No. 10/418,272, filed on Apr. 18, 2003, which is a continuation-in-part of application No. 09/649,601, filed on Aug. 29, 2000, now abandoned.

(51) Int. Cl.
*B23H 1/04* (2006.01)
*B23H 7/26* (2006.01)

(52) U.S. Cl. .................... 219/69.11; 219/69.15
(58) Field of Classification Search ............ 219/69.11, 219/69.15, 69.16; 205/665

See application file for complete search history.

(56) References Cited

U.S. PATENT DOCUMENTS

| | | | |
|---|---|---|---|
| 3,704,510 A * | 12/1972 | Sedgwick et al. | 483/9 |
| 4,515,479 A * | 5/1985 | Pryor | 356/615 |
| 4,563,800 A * | 1/1986 | Bonga | 483/16 |
| 4,739,145 A * | 4/1988 | Check et al. | 219/69.15 |
| 4,992,639 A * | 2/1991 | Watkins et al. | 219/69.2 |
| 5,248,867 A * | 9/1993 | Ohba et al. | 219/69.15 |
| 5,306,888 A * | 4/1994 | Kaneko et al. | 219/69.12 |
| 5,453,933 A * | 9/1995 | Wright et al. | 700/181 |
| 6,086,684 A * | 7/2000 | Saito et al. | 148/220 |
| 6,127,642 A * | 10/2000 | Gleason et al. | 219/69.15 |
| 6,211,480 B1 * | 4/2001 | Nagata | 219/69.11 |
| 6,396,022 B1 * | 5/2002 | Suzuki | 219/69.15 |

FOREIGN PATENT DOCUMENTS

| | | | |
|---|---|---|---|
| JP | 7-24649 A | * | 1/1995 |
| JP | 8-290332 A | * | 11/1996 |
| JP | 2000-33522 A | * | 2/2000 |
| WO | WO-00-23222 A1 | * | 4/2000 |

* cited by examiner

*Primary Examiner*—Geoffrey S. Evans
(74) *Attorney, Agent, or Firm*—Rosenberg, Klein & Lee

(57) ABSTRACT

An EDM drill comprised of an automated electrode tube replacing means to allow fully automated and continuous working on holes; and further comprised of an electrode tube guide selection device to allow fully automated and continuous working on holes of various diameters.

1 Claim, 9 Drawing Sheets

Ember# EDM DRILL

This application is a divisional of U.S. application Ser. No. 10/418,272 filed Apr. 18, 2003, currently pending, which is a Continuation-in-Part of my application filed Aug. 29, 2000, Ser. No. 09/649,601, now abandoned.

BACKGROUND OF THE INVENTION (a) Field of the Invention

The present invention relates to an EDM drill, and more particularly, to one comprised of an electrode tube changer and guide changer capable of replacing, and selecting an electrode tube and guide to achieve fully automated and continuous operation of hole discharge processing (drilling) on work pieces of different thickness and hole size.

(b) Description of the Prior Art

Please refer to FIG. 9.

EDM drilling: Chucking an electrode tube (P) on a spindle. Adjust a W-axis (W) on an X-axis (X) and a Y-axis (Y) to a starting position of a work piece. Move an electrode tube guide (G) of the W-axis (W) to where above the work piece at a proper height while allowing the electrode tube (P) pass through the guide (G). Activate a C-axis (C) to rotate the electrode tube (P) and mostly supply the dielectric fluid, and control a Z-axis (Z) movement according the condition between the electrode tube (P) and the work piece to drill a hole into the work piece by electrical-discharge power.

The prior art is observed with the following limitations: (1) It is difficult to automatically replace the electrode tube since the electrode tube practically gives no rigidity. For that reason, it prevents the use of a device like an ATC (Automatic Tool Changer) that is used by a machining center to chuck the electrode tube to the spindle today. (2) It prevents the automatic selection of a different guide size which is needed to hold different size of electrode in order to drill different size of hole.

SUMMARY OF THE INVENTION

The first purpose of the present invention is to provide an EDM drill which contains a means for automated exchange of the electrode tube. The consumed electrode tube or the electrode tube with a length not sufficient for the next round of process is automatically replaced to ensure the continuous and automated processing.

Another purpose yet of the present invention is to provide an EDM drill, containing further a means for selecting an electrode tube guide so to process holes of different sizes continuously and automatically.

DETAILED DESCRIPTION OF THE PREFERRED EMBODIMENTS

Figure 1:
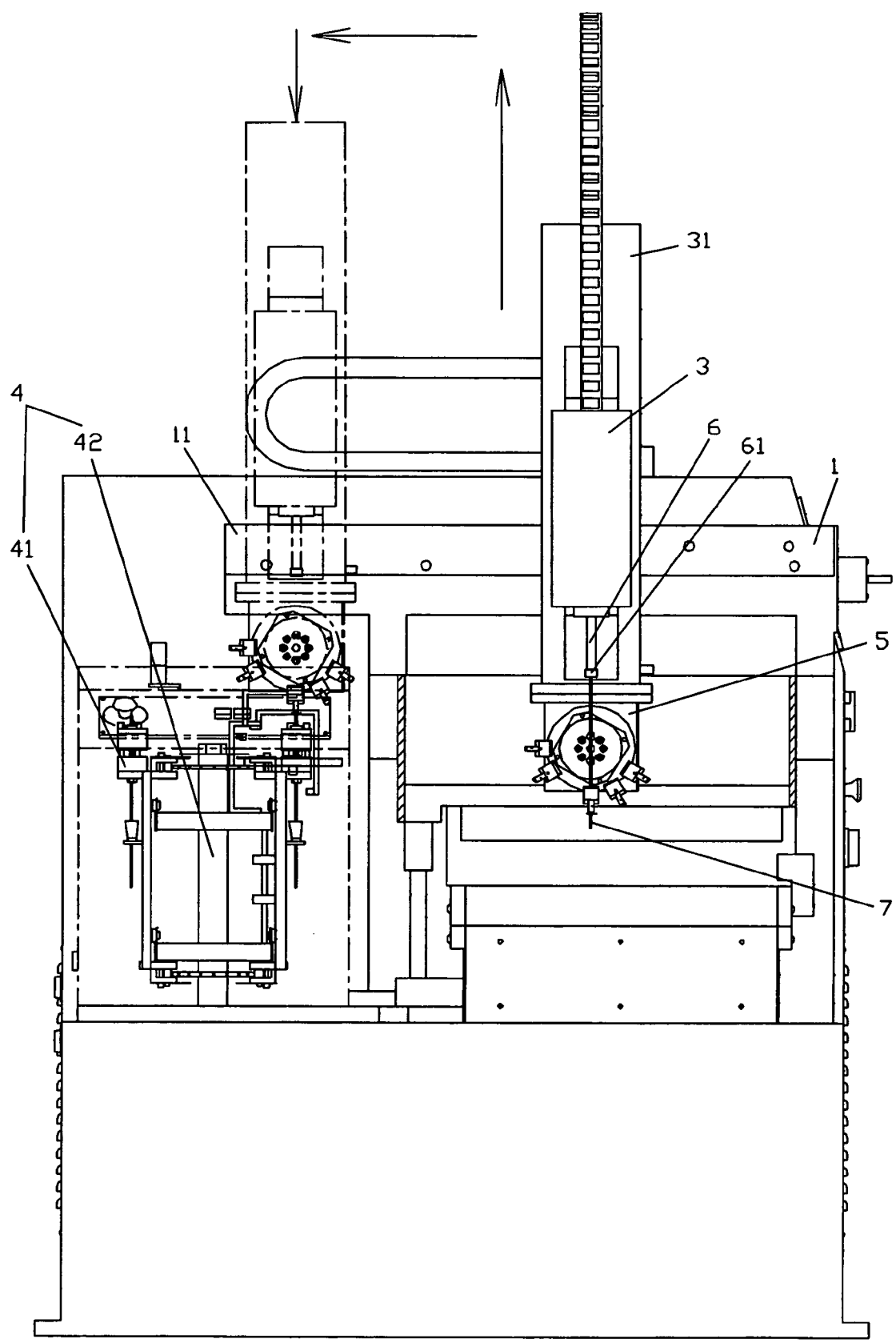
FIG. 1 is a front view showing the operation of unloading an electrode tube storage device and a spindle nut of the present invention.
Figure 2:
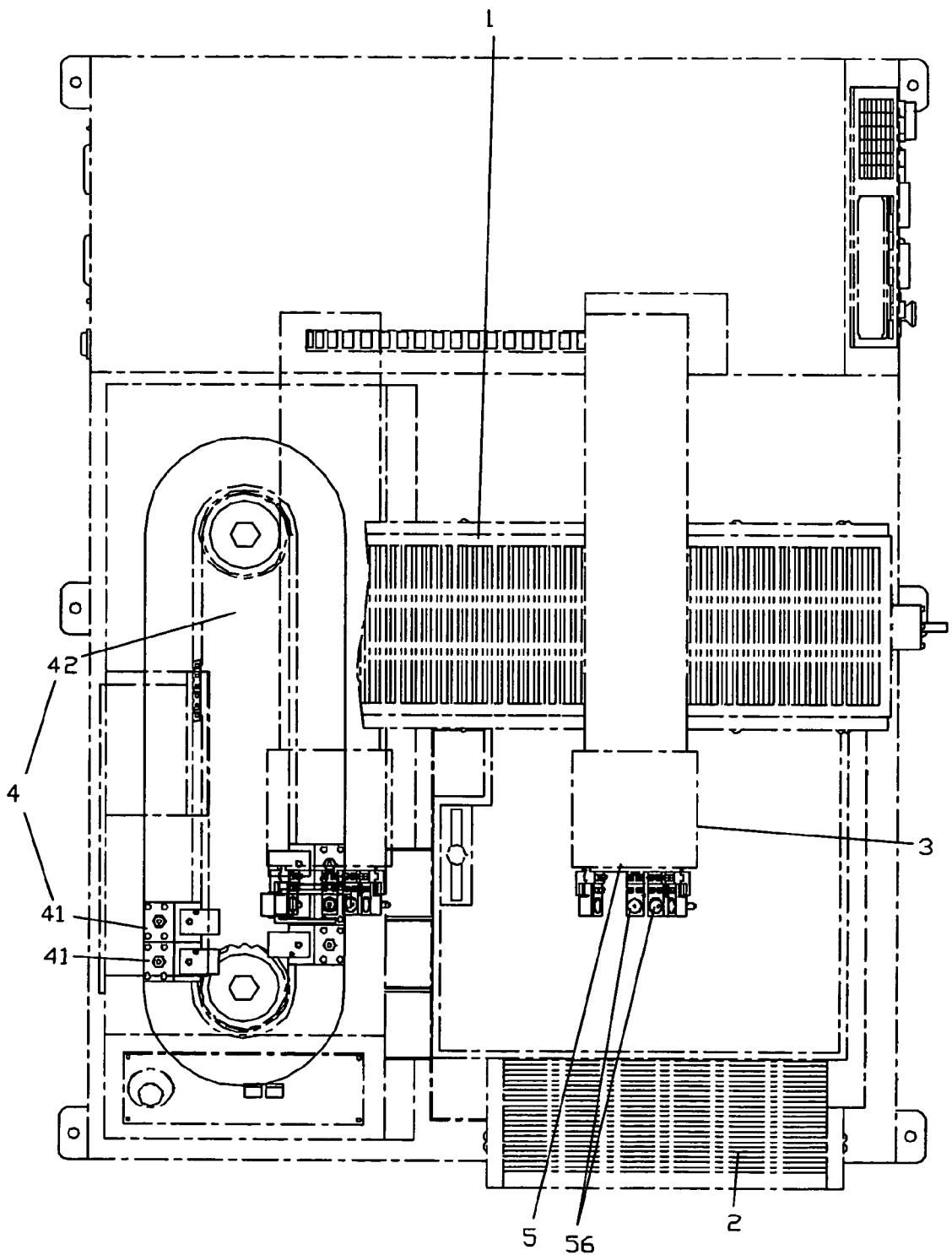
FIG. 2 is a top view of the electrode tube storage and carrousel devices of the present invention.
Figure 6:
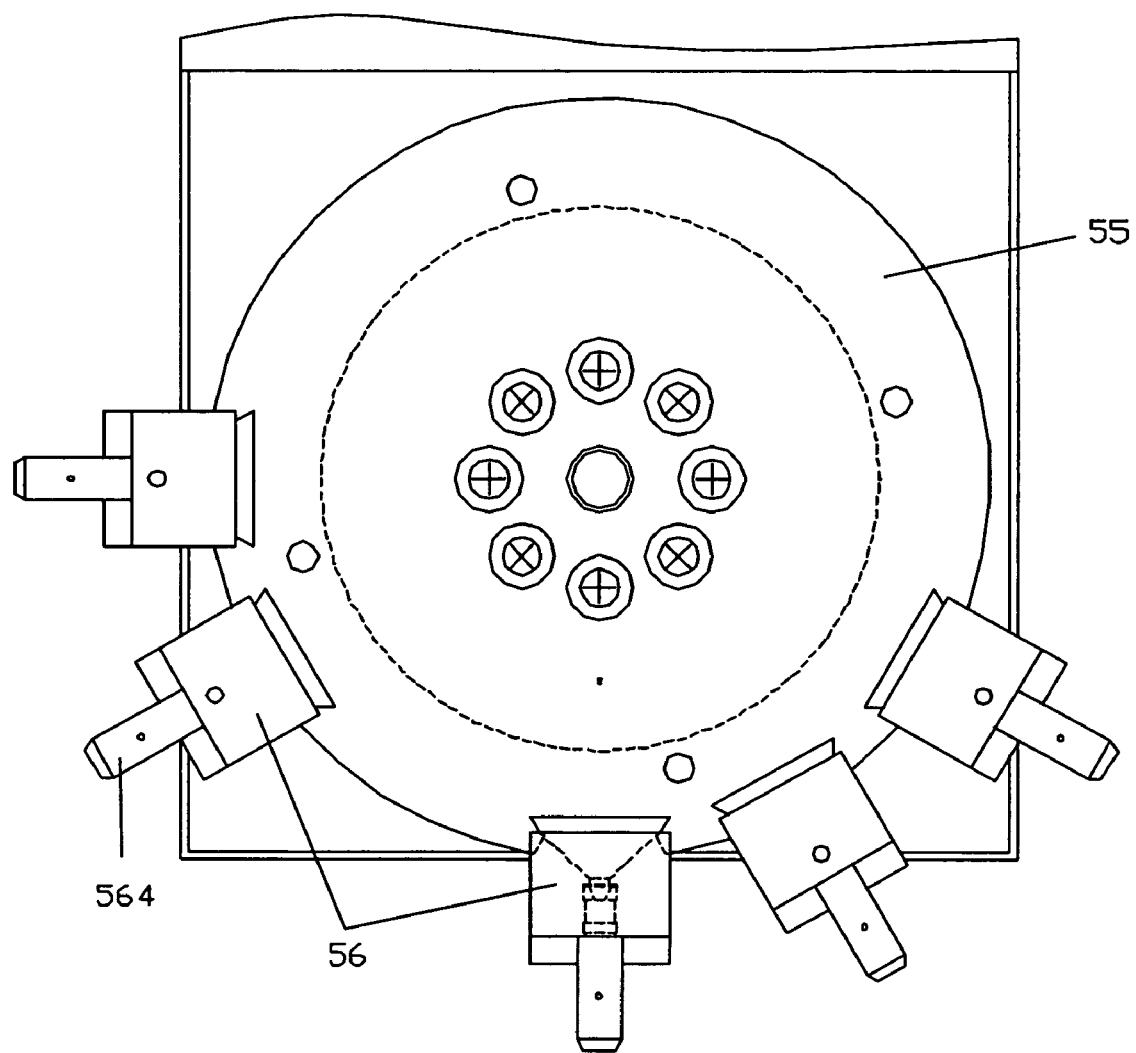
FIG. 6 is a front view of the guide selection device of the present invention.
Figure 7:
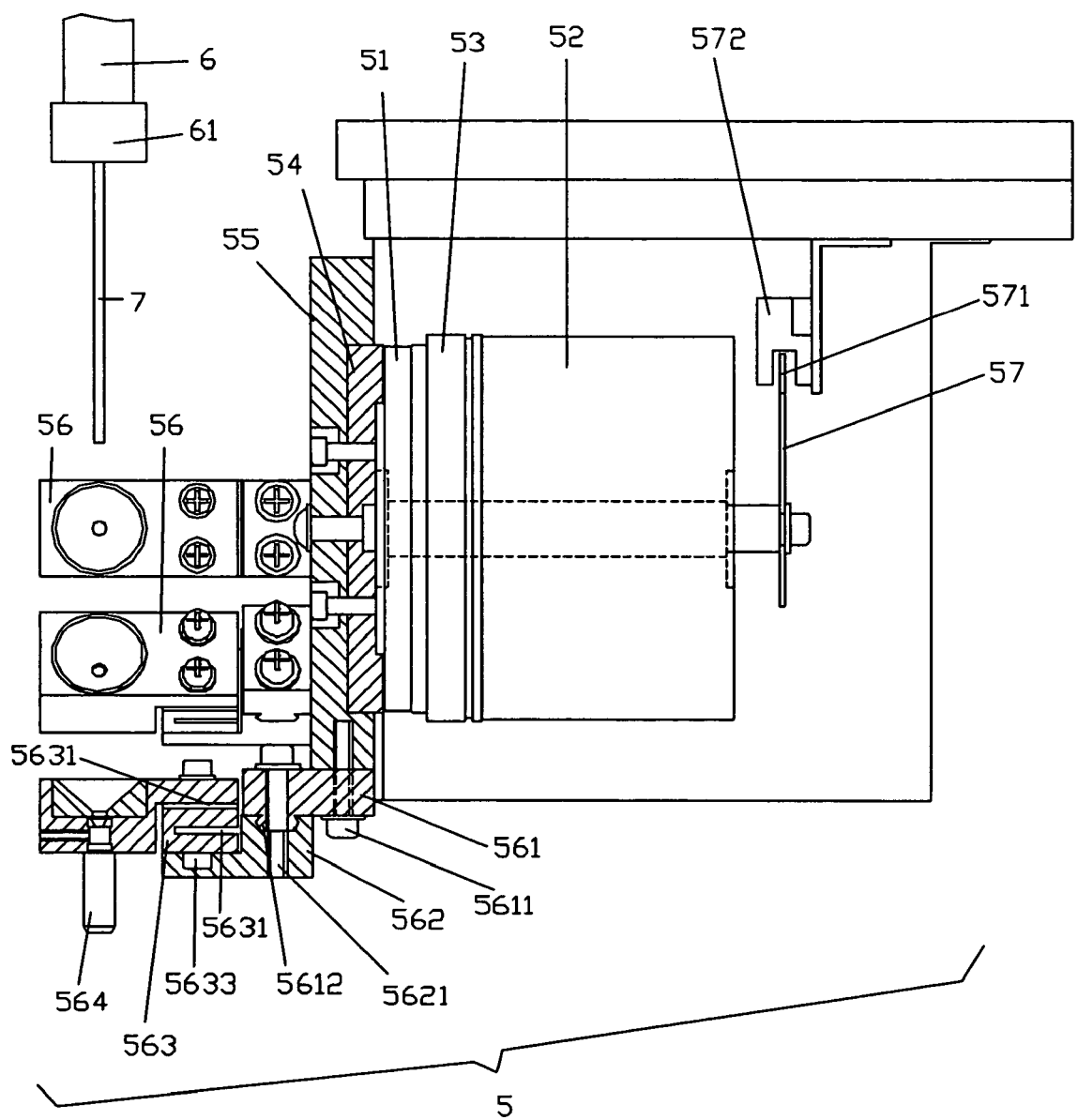
FIG. 7 is a side view of a guide selection device of the present invention.

As illustrated in FIGS. 1 and 2, the preferred embodiment of the present invention is comprised of an electrode tube storage device (4) and an electrode tube guide selection device (5) (also refer to FIGS. 6 and 7). The electrode tube storage device (4) is comprised of a plurality of electrode tube storage units (41) and other components to form a mobile electrode tube carousel (42), which is connected to engage in a cyclic movement. The preferred embodiment also contains a W-axis (31) operating on the existing an X-axis (1), or a Y-axis (2) and a spindle (6). Wherein, the X-axis (1) extends itself to become an extended X-axis (11) to provide access to the electrode tube storage device (4). The construction of a cyclic connection conveyer for the electrode tube carousel (42) is formed with cyclic chains. Under normal condition, a spindle nut (61), an electrode tube (7) and a leak-proof seal (71) are provided to each electrode tube storage unit (41). In operation, the electrode tube storage carousel (42) may deliver a single storage unit (41) in cycle to a designated point in position while the W-axis (31) moves at the X-axis (1), or the Y-axis (2) and the extended X-axis (11) to where above the electrode tube (7). The W-axis (31) also moves longitudinally parallel to a Z-axis (3) and the spindle (6) turns clockwise or counter-clockwise to load or unload the electrode tube (7).

The electrode tube guide selection device (5) can turn to any selected guide unit (56) with a proper size guide (564) on it for the insertion by the electrode tube (7).

Figure 4:
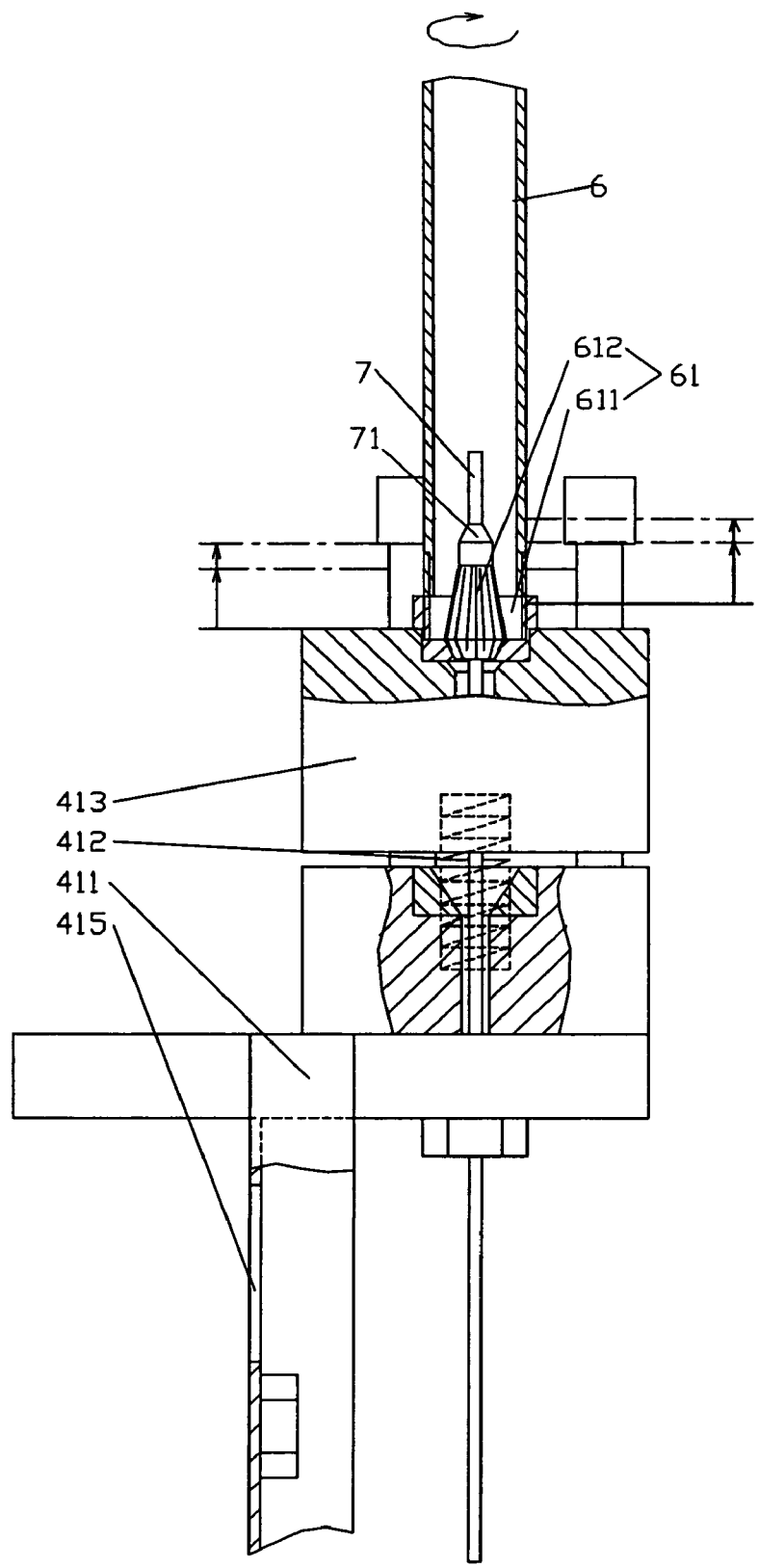
FIG. 4 is a side view showing the operation of loading the electrode tube storage device and the spindle nut of the present invention where screw threads of the spindle and the spindle nut are not engaged.

As illustrated in FIG. 4, the electrode tube storage unit (41) of the present invention relates to a rigid member (411) comprised of an elastic member (412) to absorb change in length resulted while combining or releasing the spindle nut (61) by the spindle (6), and a holder (413) to store and restrict the rotation of the spindle nut (61). Wherein, the holder (413) of the spindle nut (61) can be provided at the upper end of a frame (411) while a corresponding concave that can hold local profile of the spindle nut (61) is provided on the holder (413). An electrode tube-guarding duct (414) is provided on the frame (411) and a through-hole (not illustrated in the accompanying drawings) in upside-down cone shape is formed inside the electrode tube-guarding duct (414), which is used to protect the stored electrode tube from shaking too much during carousel movement.

Figure 3:
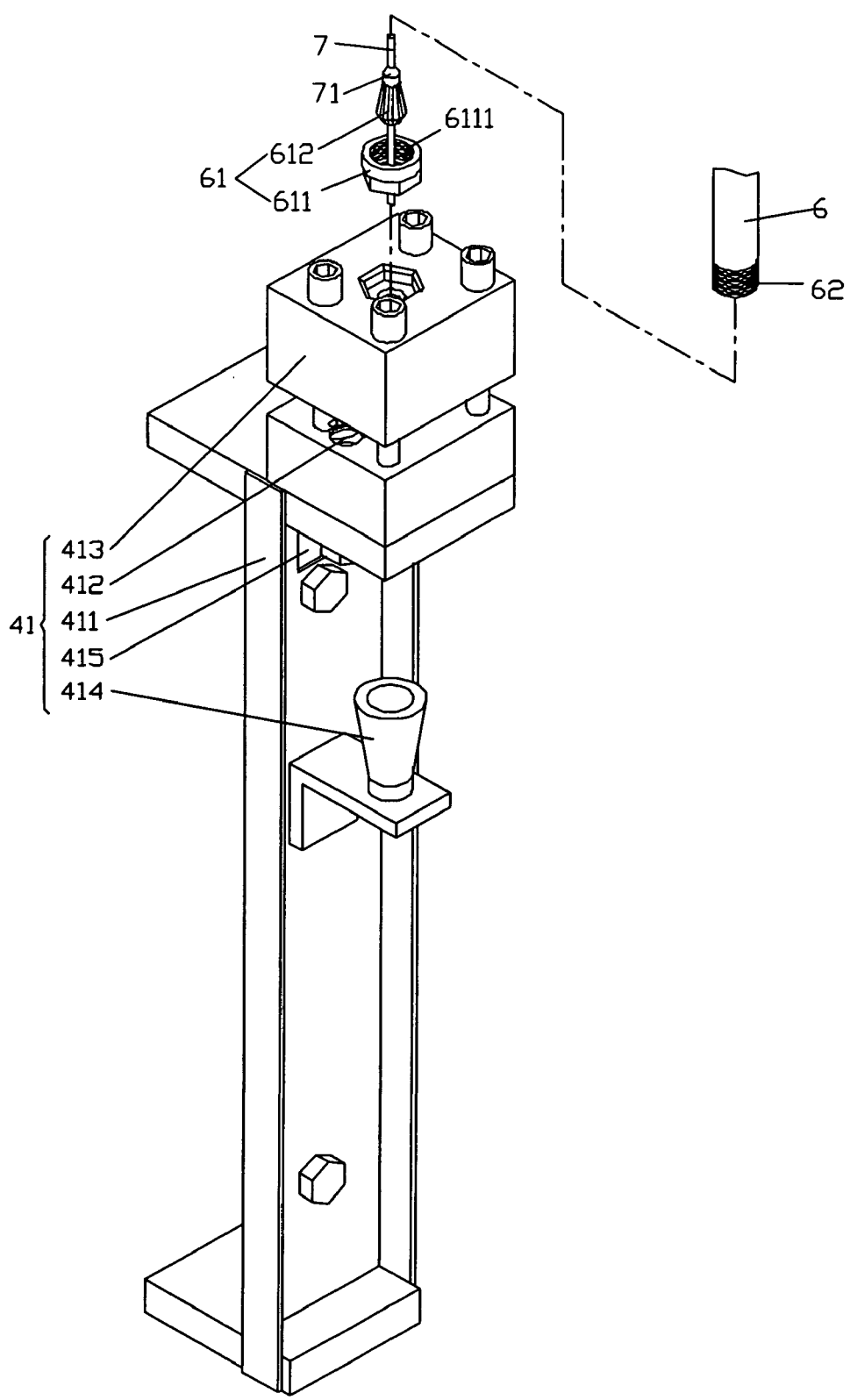
FIG. 3 is a perspective drawing showing the electrode tube storage device and the spindle nut assembly of the present invention.

The spindle nut (61) as illustrated in FIG. 3 has a nut (611) containing a collet (612) and the collet (612) chucks both of the electrode tube (7) and its leak-proof seal (71). Female threads (6111) inside the nut (611) and male threads (62) provided at the lower end of the spindle (6) are tightened or loosened to load or unload the spindle nut (61), the seal (71) and the electrode tube (7) as a whole unit.

FIG. 4 shows the cutaway view of chucking the electrode tube (7). Wherein, the spindle (6) descends until it holds against both of the nut (611) of the spindle nut (61) and the holder (413) [The nut (611) contains the collet (612), the electrode tube (7), and the seal (71)] to press against the holder (413). So the holder (413) descends and compresses the elastic member (412) to a proper position but not all way down to the end. At this time, the spindle (6) turns clockwise to engage both of the spindle nut (61) and the spindle (6) while chucking tightly the collet (612). The seal (71) is pressed and the electrode tube (7) properly chucked. Meanwhile, the elastic member (412) pushes back the holder (413) for the holder (413) to maintain restricting the nut (611) from rotating until it is screwed into the spindle (6).

Figure 5:
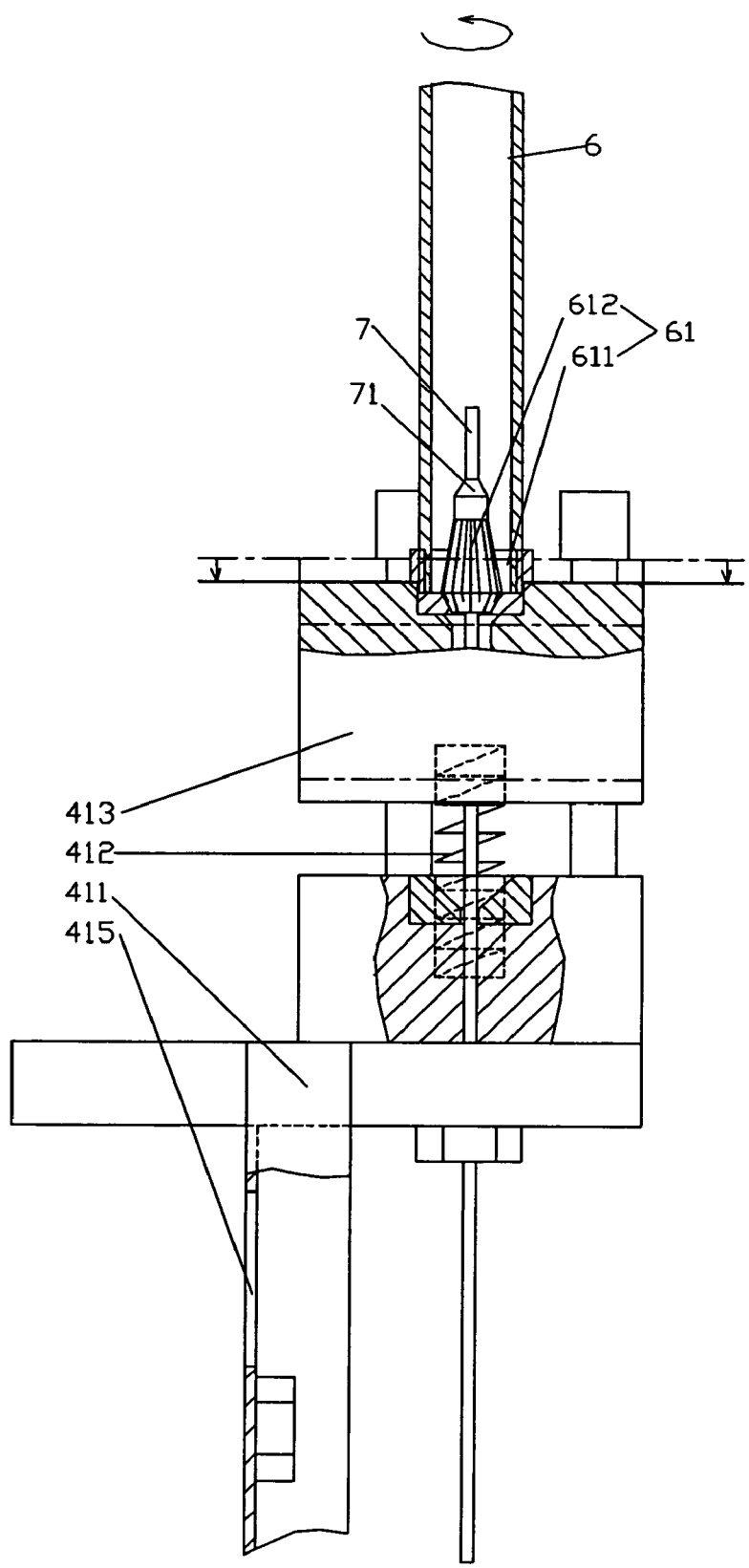
FIG. 5 is a side view showing the operation of loading the electrode tube storage device and the spindle nut of the present invention where screw threads of the spindle and the spindle nut are engaged.

As illustrated in FIG. 5, while unloading the electrode tube (7), both the spindle (6) and the spindle nut (61) are descending to where the nut (611) merely presses against and descends the holder (413) until the nut (611) clears away from the spindle (6). Wherein, the elastic member (412) absorbs the change in length or the movement of the releasing nut (611). That is, the spindle (6) creating a movement of the spindle nut (611) by fastening or releasing the spindle nut (611), and absorbing the movement of the spindle nut (611) by the elastic member (412).

As illustrated in FIGS. 6 and 7, the preferred embodiment of the guide select means of the present invention is comprised of an encoder (51), a motor (52), a brake (53), a gear (54), a rotating plate (55), a plurality of guide units (56), a home position plate (57). Wherein, the encoder (51) gives the turning angles of the rotating plate (55) or the motor (52). The brake (53) is used to restrict the gear (54), but the brake (53) may be unnecessary in case of that the backlash of the gear (54) is not big enough to affect the positioning accuracy. The gear (54) is fixed to the rotating plate (55) while the circumference of said rotating plate (55) is used to hold the guide unit (56) in position. The home position plate (57) is fixed to a turning shaft of the rotating plate (55). A mark (571) is protruding from the home position plate (57) by a sensor (572) in a cycle of rotation by the home position plate (57).

Figure 8:
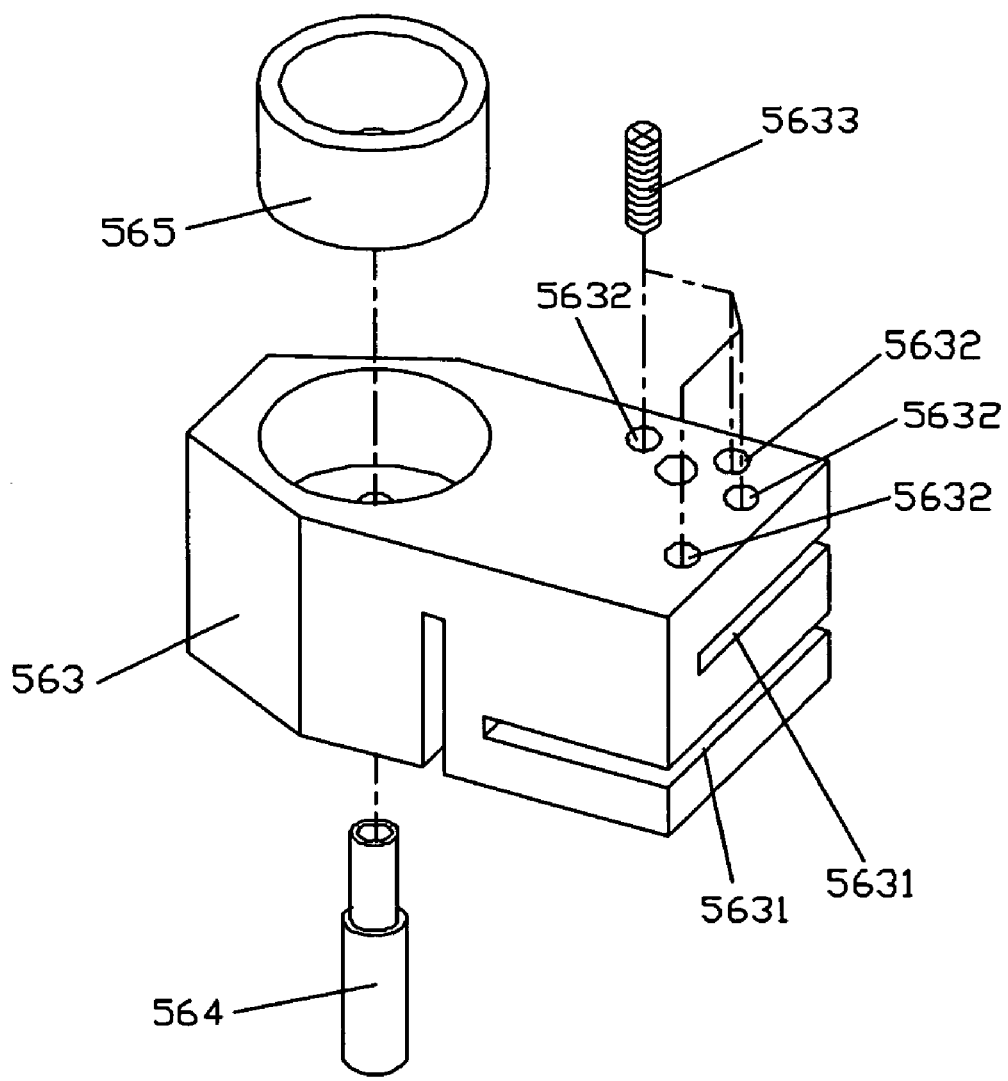
FIG. 8 is an exploded drawing showing a guide holder used by the guide selection device of the present invention.
Figure 9:
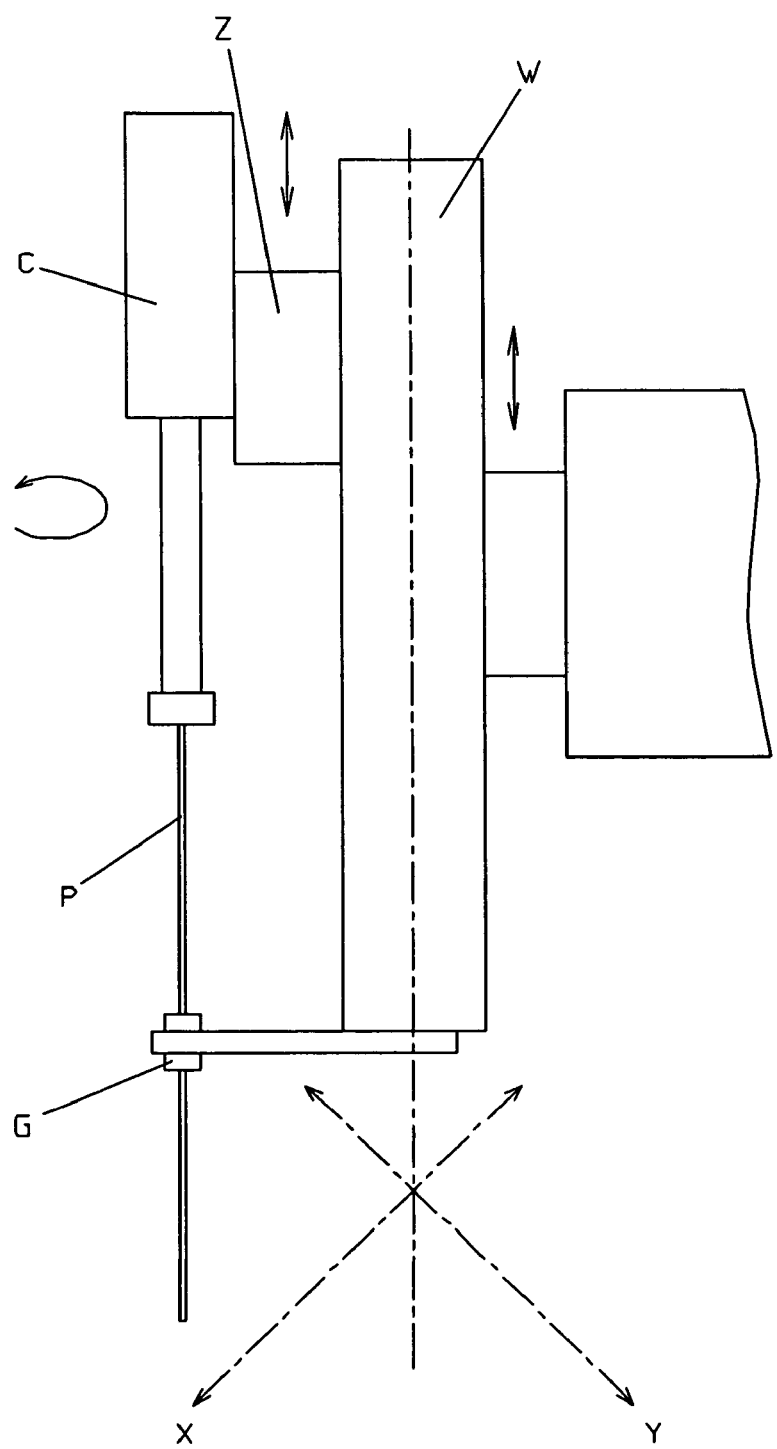
FIG. 9 is a drawing of a prior art.

FIG. 8 shows the detailed construction of the guide unit (56). As shown in FIGS. 6 and 7, the guide unit (56) is comprised of a fixation plate (561), a slide (562), a guide a holder (563), a guide (564) and a hopper (565). An oval opening (not illustrated) is provided below the fixation plate (561) (not illustrated) for a bolt (5611) to go through and fix to the rotating plate (55) and for inching the relative position between the guide unit (56) and the rotating plate (55). A dovetail (5612) is provided to the fixation plate (561) so to relatively caulk to each other with the slide (562) while inching their relative positions. The slide (562) is further connected with a bolt (5633) to the guide holder (563) whereupon the guide (564) is provided. A plurality of grooves (5631) are provided on the guide holder (563), and a plurality of bolting holes (5632) and bolts (5633) are provided on the guide holder (563). The grooves (5631) are in parallel on a horizontal plane while the bolting holes (5632) are at a right angle to the grooves (5631) and bolted to bolts (5633). Once the bolt (5633) rotates, space inclination of the grooves (5631) changes accordingly for inching the vertical degree of the guide unit (56), thus making the guide unit (56) is in the same axis with that of the spindle (6), as illustrated in FIG. 9. The hopper (565) is used to guide the electrode tube (7) into the guide (564).

In the preferred embodiment, at least one set of the guide unit (56) may be provided on the rotating plate (55) and the encoder (51) may be used to give the rotating plate (55) or the motor (52) for automated control the rotation angle of the rotating plate (55), thus the guide to the guide unit (56) required can be turned to stop at a proper position for the electrode tube (7) descending along the Z-axis (3) to pass through the guide (564) and achieve the purpose of selecting the desired guide (564). The reference point in the preferred embodiment is defined by the mark (571) of the home position plate (57). Once the motor (52) starts, the sensing by a sensor (572) is designated as the marker (571) of starting point for the determination and control to ensure that the guide unit (56) rotates to its correct position.

I claim:

1. A guide holder for an electro-erosion drilling machine is used to hold a guide and allows an alignment of said guide to parallel a travel of said spindle characterized by:

having a body with bolting holes, in order to do said alignment, a plurality of grooves are provided on said body to make it elastic enough in said alignment direction, and bolts are used to hold said body to deflect said grooves to complete said alignment of said guide.

* * * * *